United States Patent [19]

Peterson

[11] Patent Number: 4,490,334
[45] Date of Patent: Dec. 25, 1984

[54] INSULATION OF DOMED REACTOR VESSELS

[75] Inventor: John R. Peterson, Randolph, N.J.

[73] Assignee: Exxon Research and Engineering Co., Florham Park, N.J.

[21] Appl. No.: 439,380

[22] Filed: Nov. 5, 1982

[51] Int. Cl.³ .................. B01J 19/02; B01J 3/00; F27D 1/00

[52] U.S. Cl. .................. 422/241; 220/452; 422/242

[58] Field of Search .......... 422/211, 241, 242; 264/30; 266/280, 281, 286; 110/173 A; 428/99; 432/3, 76, 250; 220/452

[56] References Cited

U.S. PATENT DOCUMENTS

| | | |
|---|---|---|
| 1,326,767 | 12/1919 | Moore ................ 422/211 |
| 2,181,153 | 11/1939 | Prickett ............ 422/241 X |
| 2,738,094 | 3/1956 | Fowler .............. 220/452 |
| 3,113,691 | 12/1963 | Jezowski .......... 220/452 X |
| 3,476,283 | 11/1969 | Heinze et al. .......... 220/15 |
| 3,836,612 | 9/1974 | Mann ................ 264/30 |
| 3,854,262 | 12/1974 | Brady ............... 52/404 |
| 3,930,916 | 1/1976 | Shelley ............. 156/71 |
| 3,990,203 | 11/1976 | Greaves ............ 52/227 |
| 4,120,641 | 10/1978 | Myles ............... 432/3 |
| 4,225,055 | 9/1980 | Hills et al. ........ 220/452 |
| 4,338,756 | 7/1982 | Crothers .......... 220/452 X |
| 4,347,949 | 9/1982 | Bennett ........... 220/452 X |

Primary Examiner—Barry S. Richman
Assistant Examiner—William R. Johnson
Attorney, Agent, or Firm—Donald F. Wohlers

[57] ABSTRACT

A compressed ceramic fiber blanket insulation is held in place in the domed portion with a plurality of curved ribs, or alternatively, the combination of curved ribs and a wire mesh. Such arrangement is preferable for holding fiber blanket insulation material over possible alternate methods for securing it since the thermal expansion of the ribs at elevated operating temperature of the vessel is designed to progressively compact the blanket lining to counteract any fiber shrinkage or associated expansion of the metal shell casing.

9 Claims, 2 Drawing Figures

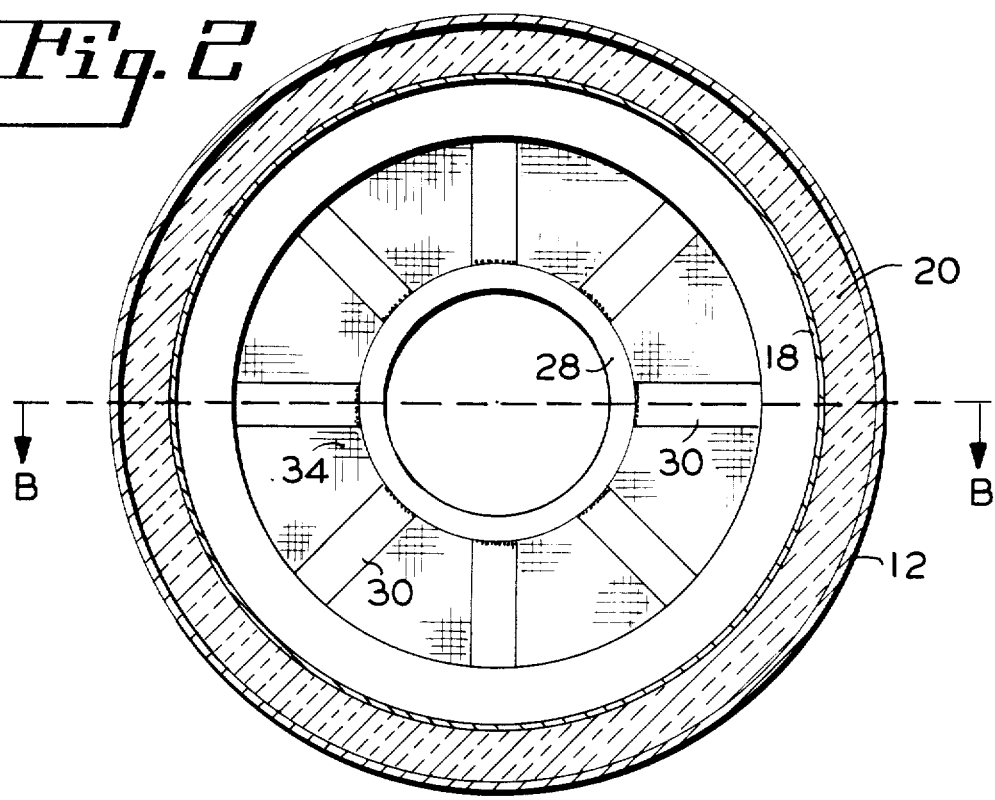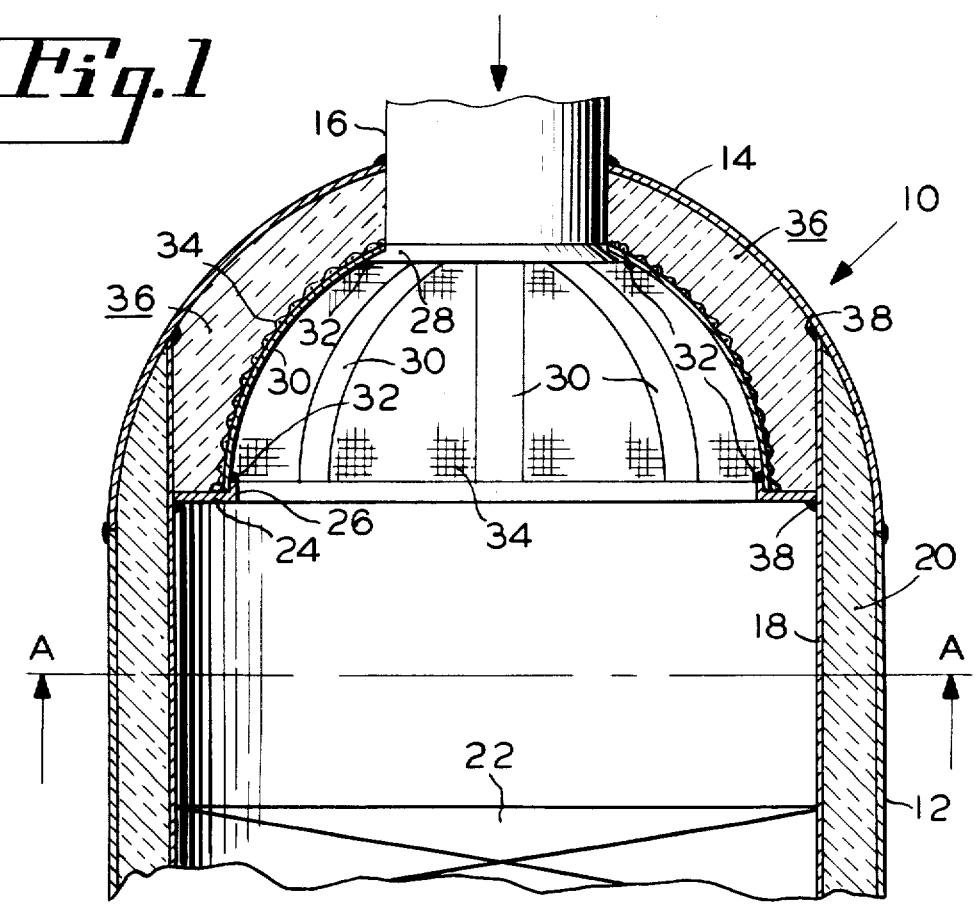

INSULATION OF DOMED REACTOR VESSELS

BACKGROUND OF THE INVENTION

This invention relates to a novel method and apparatus for securing ceramic fiber blanket insulation linings to the interior walls of a process vessel which has the result of improving their overall reliability and serviceability within the reactor environment. The invention makes possible the replacement of castable refractory linings in the domed head portions of cold shell reactors. Typically, in the dome of such reactor vessels, it has been conventional to secure castable refractory thereto by the use of welded steel anchors to the interior wall of the shell and the application of castable refractory thereover. When such castable refractory linings require repair due to breakdown of the insulation properties of the lining system, considerable time and expense is consumed. Lining repairs typically involve the shut-down of the unit, cool-down, dumping of catalyst, building of scaffolding within the process vessel, jackhammer removal of the failed refractory and repair of the shell and anchors and reapplication of castable refractory. Completion of these steps usually requires at least 72 hours. Thereafter, the newly applied castable refractory would additionally require approximately 24 hours for curing, as much as 36 hours for dry-out and inspection thereafter before the unit could be brought back into service. Obviously, therefore, it is very desirable and an object of the present invention to provide a new and novel insulation attachment system for ceramic blanket-type insulation which may be readily applied to the domed head or bottom portions of a cylindrical reactor shell much more readily than the previously described conventional technique of lining these portions with castable refractory secured to the shell through the use of intermediate welded steel anchors.

SUMMARY OF THE INVENTION

To overcome the drawbacks and disadvantages of using a castable refractory in the domed portion of a reactor vessel, the present invention contemplates the use of a compressed ceramic fiber blanket insulation held in place in the domed portion with a plurality of curved ribs, or alternatively, the combination of curved ribs and a wire mesh. Such arrangement is preferable for holding fiber blanket insulation material over possible alternate methods for securing it since the thermal expansion of the ribs at elevated operating temperature of the vessel is designed to progressively compact the blanket lining to counteract any fiber shrinkage or associated expansion of the metal shell casing, thereby preventing the formation of void spaces in the lining, particularly between its peripheral portions and that of the adjacent vessel structure. This feature is critical to good blanket lining performance because void spaces will obviously be detrimental to the overall insulating properties of the vessel lining system. Another advantage of the structure of the present invention is that upon reactor vessel shut-down, the lining may be readily removed to facilitate inspection of the heretofore hidden portions of the inner shroud of the reactor vessel and inspection of the domed head casing beneath the ceramic blanket insulation. A still further feature of the present novel method of installing blanket insulation is that continued satisfactory performance of the insulation, as contrasted with that of the alternative castable refractory insulation, does not depend upon the mechanical integrity of a steel anchor or a mechanical lock, either of which may fail due to thermal expansion or castable refractory dimensional during service. Accordingly, it is an object of the present invention to provide a new and improved insulation system for insulating the interior wall of the domed portion of a cold shell reactor vessel as typically used in petroleum processes.

A further object of the invention is to provide a blanket insulation system in the head end portions of a reactor vessel wherein the support for the blanket is provided over a large surface area thereof, thereby preventing tear-away of the fiber from the domed portion.

Still another object of the invention is to provide a blanket insulation securing system within a reactor vessel wherein thermal expansion due to elevated temperatures has the effect of further compacting the fiber blanket lining to thereby counteract any fiber shrinkage that might otherwise occur at such temperatures and to thereby prevent the formation of void spaces in the lining.

A still further object of the invention is to provide an insulation mounting system for a domed head portion of a reactor completely eliminating the need for welding metal anchors directly to the shell casing.

Yet a further object of the invention is to provide a ceramic fiber blanket lining insulation system for a domed cold shell reactor which may be readily retrofitted to existing reactors of such type having conventional castable refractory dome insulation.

These and other objects and advantages of the invention will become apparent and the invention will be more fully understood from the following description and drawings in which:

FIG. 1 is a fragmentary vertical section of an upper portion of a typical cold shell petroleum process reactor vessel taken along line B—B of FIG. 2; and FIG. 2 is a horizontal cross-sectional view taken along line A—A of FIG. 1 looking in the direction of the arrows.

DETAILED DESCRIPTION OF THE INVENTION

Referring to FIGS. 1 and 2 in particular, a top portion of a typical petroleum reactor vessel is shown generally at 10. The vessel 10 includes an outer cylindrical shell portion 12 and a hemispheric or domed upper end portion 14. The domed head portion 14 includes an inlet conduit 16 for entry of a process stream therethrough. The inlet conduit 16 includes a lower end inclined lip portion 28 which forms a stop plate surface. Typically, a cold shell reactor of the type shown in FIG. 1 includes an inner metallic shroud 18 of high performance alloy steel such as stainless steel which may be made relatively thin compared to the structural integrity required of the outer wall 12 of the pressure vessel. The space between the shroud 18 and the shell 12 is filled with sidewall refractory insulation 20. The upper portion of the shroud 18 is weldably secured at 38 to the inner surface wall of the domed upper portion 14. The interior of the reactor vessel 10 is typically provided with one or more beds of catalyst material schematically shown at 22.

Substantially coincident with the juncture between the domed portion 14 and the cylindrical side portion 12, there is provided an annular stop plate or ring 24 which projects radially inward from the shroud 18 and is weldably secured thereto. This stop plate 24 provides a lower support surface for the hemispheric blanket of ceramic fiber insulation material generally shown at 36. The ceramic fiber blanket 36 extends arcuately upwardly into contact with the outer surface of the inlet conduit 16 and is held in tight compacted relationship with the internal wall of the dome 14 by a plurality of curved ribs 30. The curved ribs 30, preferably of stainless steel such as 304 SS, are weldably attached to an upstanding lip portion 26 integral with the stop plate 24 at their lowermost ends and are in turn weldably attached to the lip portion 28 of the inlet 16 by welds 32. As is shown in FIG. 1, a hemispheric wire mesh screening 34 of stainless steel material is also provided and is disposed between the ribs 30 and the inner surface of the blanket 36. While applicant has chosen to illustrate his arrangement for holding the blanket 36 against the dome portion as including both the wire mesh 34 and the plurality of ribs 30, it will be understood that the wire mesh may be dispensed with if desired and adequate pressure and securing of the insulation may be accomplished through the use of a plurality of spaced ribs 30 alone.

In the installation of the insulation blanket material 36, it has been found to be desirable to employ a layered construction having a density of approximately 6 to 8 pounds per cubic foot in its natural, uncompacted state. It is also desirable to line the head or dome portion to a thickness of approximately 118% to 120% of the ultimate intended lining thickness after installation of the curved ribs 30. Subsequently, the fiber blanket 30 is compacted in a range of 15 to 20% precompression, and thereafter held in substantially such compressed state by the subsequent welding of each of the ribs 30 between the lips 26 and 28 by appropriate bead welds 32. In this configuration, as the process heat within the vessel 14 causes thermal expansion and therefore elongation and further bowing of the ribs 30, additional and progressive compaction of the fiber blanket at elevated temperatures will occur. This is particularly desirable to compensate for dimensional charges in the reactor vessel and for any shrinkage of the blanket 36 that might occur and that might otherwise create voids in the insulation integrity.

From the foregoing description of applicant's invention, it may be readily seen that various advantages over conventional castable refractory linings are present. For instance, the present arrangement eliminates the susceptability of the dome lining to thermal stress damage typically experienced by castable refractories, and therefore offers significant potential for increased reactor service life between scheduled maintenance periods. Another advantage of the present ceramic fiber dome insulation arrangement is that superior insulating properties are available from commercially available ceramic fiber blanket material such as the trademarked material known as KAOWOOL. The effective thermal conductivity of KAOWOOL is approximately one-half that of conventional castable refractories. This advantage of the improved insulating qualities of such blankets has the potential for reducing the temperatures of the external structural steel in critical areas to thereby improve the design safety factors. It is also believed that out-of-service time for internal refractory or insulation repairs may be reduced by as much as 70% over that now experienced in similar type reactors having prior art castable domed refractory insulation linings.

While a specific embodiment of the invention has been shown and described in detail to illustrate the application of the inventive principals, it will be understood that the invention may be embodied otherwise without departing from such principals. In particular, while applicant has shown and illustrated his invention as applied to the uppermost domed head portion of the reactor vessel, those skilled in the art will readily appreciate that its teachings and application are equally useful in a corresponding domed lower portion of the same or similar reactor vessel. Accordingly, while applicant has chosen to illustrate the inventive principals of his invention with respect to a reactor inlet conduit, it is equally applicable to securing insulation to a reactor vessel outlet conduit, which typically would be at the lower portion of such reactor vessel.

What is claimed is:

1. In an insulated and lined cylindrical pressure vessel having at least one domed end portion, the improvement comprising an insulation support system, said system including an annular metallic stop plate secured to the inner lining of said cylindrical pressure vessel in the general region of the base of said domed end portion and projecting inwardly therefrom, conduit means communicating with the interior of said vessel and projecting inwardly through a central portion of said domed end portion, a concave ceramic fiber insulating blanket lining the interior surface of said end portion, said blanket contacting and extending between said stop plate and said conduit means, and a plurality of spaced elongated arched rib members interior of said blanket, each said rib member being fixedly secured at its opposite ends respectively to the stop plate and said conduit means, each of said rib members being of such a length relative to the spacing between said stop plate and said conduit means so as to form a concave curved arch pressing against said insulating blanket and securing said blanket to the interior of said domed end portion.

2. The combination of claim 1 wherein the density of said ceramic fiber insulation blanket is between 6 and 8 pounds per cubic foot and is compressed approximately 20% from its normal volume by said rib members.

3. The combination of claim 1 wherein the inner end of said conduit means includes an annular flange to which the end of each rib member has been weldably secured.

4. The combination of claim 1 including a wire mesh screening disposed adjacent the interior surface of said blanket and held thereagainst by said rib members.

5. The combination of claim 4 wherein the density of said ceramic fiber insulation blanket is between 6 and 8 pounds per cubic foot and is compressed approximately 20% from its normal volume of said rib members.

6. A petroleum process reactor vessel comprising a generally cylindrical outer shell portion, refractory insulation means interior of said shell portion, at least one domed end portion secured to said shell portion, cylindrical metal shroud means lining the interior of said insulation means, said shroud extending into said domed end portion and being attached thereto, a catalyst bed within said vessel, an annular metallic stop plate secured to said shroud in the general region of the base of said domed end portion and projecting inwardly therefrom, conduit means communicating with the interior of said vessel and projecting inwardly through a central portion of said domed end portion, and including a flanged end portion, a concave ceramic fiber insulating blanket contacting and extending between said stop plate and said conduit means, and a plurality of spaced elongated arched rib members interior of said blanket, each said rib member being fixedly secured at its opposite ends respectively to the stop plate and said flanged end portion, each of said rib members being of such a length relative to the spacing between said stop plate and said conduit means so as to form a concave curved arch pressing against said insulating blanket and securing said blanket to the interior of said domed end portion.

7. The combination of claim 6 wherein the density of said ceramic fiber insulation blanket is between 6 and 8 pounds per cubic foot and is compressed approximately 20% from its normal volume by said rib members.

8. The process vessel of claim 6 including a wire mesh screening disposed adjacent the interior surface of said blanket and held thereagainst by said rib members.

9. The combination of claim 8 wherein the density of said ceramic fiber insulation blanket is between 6 and 8 pounds per cubic foot and is compressed approximately 20% from its normal volume by said rib members.

* * * * *